May 2, 1939.  M. KNOLL  2,156,915

ARRANGEMENT FOR REFLECTING OF CATHODE RAYS

Filed March 14, 1936

INVENTOR
MAX KNOLL
BY H. G. Grover,
ATTORNEY

Patented May 2, 1939

2,156,915

UNITED STATES PATENT OFFICE 2,156,915

ARRANGEMENT FOR REFLECTING OF CATHODE RAYS

Max Knoll, Berlin, Germany, assignor to Telefunken Gesellschaft für Drahtlose Telegraphie m. b. H., Berlin, Germany, a corporation of Germany Application March 14, 1936, Serial No. 68,970
In Germany March 16, 1935

15 Claims. (Cl. 250—159)

The invention relates to an arrangement for reflecting cathode rays, whereby two electrodes are placed in the path of the cathode rays, and between which lies an electrical field reducing the velocity of the cathode rays entering the electrode arrangement, said electrical field having a greater total potential difference than would correspond to the velocity of the cathode rays.

A series of embodiments of the invention will be described in the following with reference to the accompanying drawing in which they are schematically represented.

Figure 1:
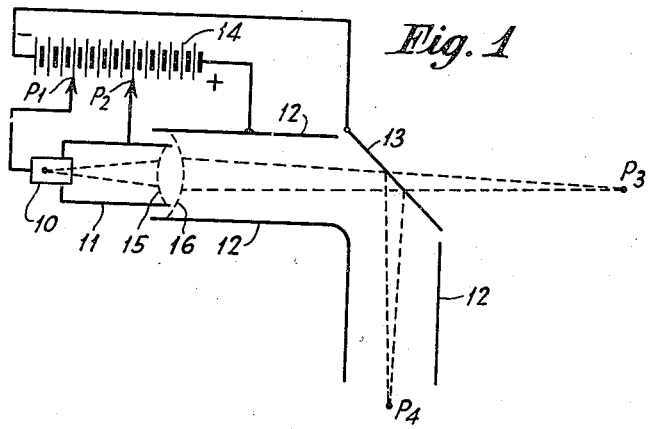
Figure 2:
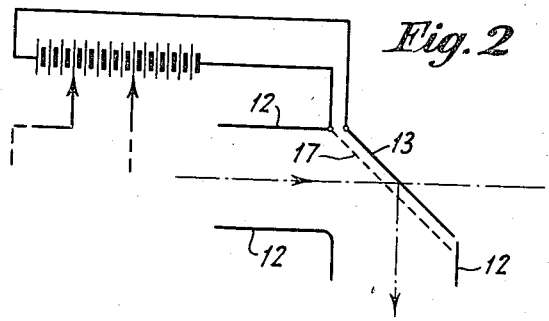
Figure 3:
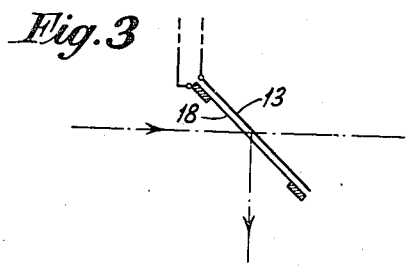
Figure 4:
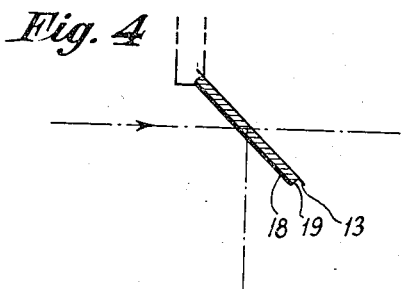

In the drawing, Fig. 1 shows schematically one form of electrode system embodied in my invention;

Fig. 2 shows schematically a modification of the embodiment shown in Fig. 1 of my invention, and Figs. 3 and 4 show modified forms of the retarding electrode shown in Figs. 1 and 2.

In Figure 1, item 10 designates a system for producing cathode rays, i. e., an arrangement comprising a cold cathode or incandescent cathode as well as an anode. Item 11 designates an electrode conductingly connected to the anode of the system 10, and 12 is a further electrode arranged insulated from the electrode 11. The electrodes 11 and 12 may be formed for instance by an inner covering of the glass vessel consisting of conductive carbon. The arrangement furthermore includes a metal plate 13 likewise insulated against the electrode 12. This metal plate 13 has a negative potential relative to the cathode in the system 10, i. e., it is placed at the negative end of a D. C. source 14 at whose tap points $P_1$ and $P_2$ respectively the cathode of the system 10, and the electrode 11 are connected respectively, while the electrode 12 is placed at the positive pole of the D. C. source 14.

The arrangement according to Figure 1 functions in the following manner:

If metal plate 13 would be absent, the cathode rays would be concentrated upon the point $P_3$ by the electrical lens formed by two equi-potential surfaces 15, 16 shown in dash lines between the electrodes 11 and 12. In the presence of the metal plate 13, there will be produced however, between this metal plate and the horizontal part of electrode 12, an electrical field towards which the cathode rays must pass after they have passed through the lenses 15, 16, and which field decreases the velocity of the cathode rays. At a distance from the metal plate 13 which is the shorter the lower the potential between point $P_1$ and the negative end of battery 14, the component of the velocity of the cathode rays at right angle to the plane of the metal plate is fully consumed and there remains only a component of the velocity extending parallel to the plane of plate 13. From this point, the cathode rays follow the lines of force passing from the metal plate 13 towards the vertical part of electrode 12 and they undergo an acceleration again in the last mentioned field, since the velocity component extending parallel to the plane of plate 13 remains unchanged the beam of rays will hereby be concentrated on point $P_4$. As a whole, the performance can be considered as a reflexion of cathode rays, since the location of the electron source in the system 10, the position of the metal plate 13 and the location of the electron concentration point $P_4$ are similar to each other, as if it were a question of light rays and a reflection at a mirror.

In the arrangement shown in Figure 2, a network of fine meshes 17 is placed within a short distance from plate 13 and which has the same potential as the electrode 12. Otherwise the arrangement and circuit are the same as shown in Figure 1. Between the metal plate 13 and the net 17, a homogeneous electrical field will be formed into which the cathode rays enter in the horizontal direction, and hence at a certain angle to the lines of force. The velocity component at right angle to the plane of plate 13 will be reduced to zero, whereas the velocity component extending parallel to this plate remains unchanged. Following the reduction to zero of the first mentioned velocity component, the electrons will again be accelerated and pass through the net 17 a second time whereby the absolute value of the velocity thereof is the same as when they entered the homogeneous field, while however the direction of the velocity thereof has changed. Hence, also in the arrangement according to Figure 2 the performance can be considered as a reflexion of cathode rays.

In the arrangement according to Figure 3, the network 17 of Figure 2, is replaced by a thin metal foil 18. Otherwise the arrangement and the circuit as well as the functioning is the same as in the case of Figure 2.

Figure 4 shows an arrangement in which there is applied to the metal plate 13, an insulator 19 preferably of glass, mica, or aluminum oxide and a metal foil 18 is placed on the said insulator. This arrangement likewise operates substantially in the same manner as that according to Figure 2.

The metal plate 13 of all embodiments described may also be substituted by a net-like electrode.

As material for the foil 18 according to Figures 3 and 4, beryllium or aluminum may preferably be used.

What I claim is:

1. The method of focusing electrons which comprises the steps of producing a beam of electrons, producing an accelerating and converging electric field for focussing the electrons upon an impact area at a predetermined distance from the beam origin and electrostatically reflecting the beam of electrons intermediate the origin point and the focusing point to cause the beam to focus upon an impact area angularly disposed relative to the normal impact area.

2. The method of focusing electrons which comprises the steps of producing a beam of electrons, directing the electrons along a predetermined path, focusing the beam normally at a predetermined distance from the point of origin and electrostatically reflecting the beam intermediate the point of origin and the point of normal focus to cause the produced beam to focus upon an angularly disposed area substantially equi-distant from the point of beam origin.

3. The method of focusing electrons which comprises the steps of producing a beam of electrons, directing the beam of electrons along a predetermined path with its velocity component parallel to the projection path, interposing a retarding electrostatic field in angular relation to the predetermined path to change the direction of the velocity component to an angular relationship with respect to the initial velocity component, and producing a contiguous accelerating field to bring the electrons to a common focal point.

4. The method of focusing electrons which comprises the steps of producing a beam of electrons, directing the beam of electrons along a predetermined path, interposing a retarding electrostatic field in angular relation to the predetermined path, and regulating the gradient of the electrostatic field to prevent complete penetration of the field by the beam of electrons.

5. The method of focusing electrons which comprises the steps of producing a beam of electrons, directing the beam of electrons along a predetermined path, interposing a retarding electrostatic field in angular relation to the predetermined path, producing a contiguous accelerating field to bring the electrons to a common focal point, and regulating the gradient of the electrostatic field to prevent complete penetration of the field by the beam of electrons.

6. The method of focusing electrons which comprises the steps of producing a beam of electrons, directing the beam of electrons along a predetermined path, interposing a retarding electrostatic field in angular relation to the predetermined path, producing a contiguous accelerating field, and regulating the gradient of the accelerating field to produce convergence of the beam of electrons.

7. The method of focusing electrons which comprises the steps of producing a beam of electrons, directing the beam of electrons along a predetermined path, interposing a retarding electrostatic field in angular relation to the predetermined path, producing a contiguous accelerating field to bring the electrons to a common focal point, regulating the gradient of the electrostatic field to prevent complete penetration of the field by the beam of electrons, producing an accelerating field contiguous to the decelerating field, and regulating the gradient of the accelerating field to produce convergence of the beam of electrons.

8. The method of focusing electrons which comprises the steps of producing a beam of electrons, subjecting the beam of electrons to accelerating potentials along a predetermined path, interposing a retarding field along the path of the electrons, and regulating the interposed field to have a potential whose absolute value is greater than that of the accelerating potential.

9. The method of focusing electrons which comprises the steps of producing a beam of electrons, subjecting the beam of electrons to accelerating potentials along a predetermined path, interposing a retarding field along the path of the electrons, regulating the interposed field to have a potential whose absolute value is greater than that of the accelerating potential, and producing a contiguous accelerating field to converge the beam of electrons to a common focal point.

10. In combination, an electron gun for forming and projecting an electron beam along a predetermined path, a convergent electronic lens for focusing the beam upon a plane at a predetermined distance from the gun, and an electronic reflector interposed between the gun and the plane whereat the beam is normally focused for altering the location of the focus thereof to a plane angularly disposed to the normal focusing plane and substantially equi-distant from the gun.

11. In combination, an electron gun for forming and projecting an electron beam along a predetermined path, an electrostatic convergent electron lens for focusing the beam upon a plane at a predetermined distance from the gun, and an electrostatic electron mirror interposed between the gun and the plane whereat the beam is normally focused for altering the location of the focus thereof to a plane angularly disposed to the normal focusing plane and substantially equi-distant from the gun.

12. An electron mirror comprising a tubular electrode having an aperture therein and its ends lying in mutually perpendicular planes, and a plane electrode concentric and in a parallel plane with the aperture.

13. An electron mirror comprising a tubular electrode having an aperture therein and its ends lying in mutually perpendicular planes, a conducting member covering the aperture, and a plane electrode adjacent to and parallel with the conducting member.

14. An electron mirror comprising a tubular electrode having an aperture therein and its ends lying in mutually perpendicular planes, a conductive mesh-like member covering said aperture, and a plane electrode adjacent to the conductive mesh-like member.

15. An electron mirror comprising a tubular electrode having an aperture therein and its ends lying in mutually perpendicular planes, a conducting member covering the aperture, a plane electrode adjacent to and parallel with the conducting member, and an insulating medium interposed between the plane electrode and the conducting member.

MAX KNOLL.